United States Patent
Lee

(10) Patent No.: US 10,394,399 B2
(45) Date of Patent: Aug. 27, 2019

(54) CAPACITIVE TOUCH PANEL

(71) Applicant: eGalax_eMPIA Technology Inc., Taipei (TW)

(72) Inventor: Cheng-Han Lee, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 35 days.

(21) Appl. No.: 15/608,075

(22) Filed: May 30, 2017

(65) Prior Publication Data

US 2017/0344154 A1   Nov. 30, 2017

Related U.S. Application Data

(60) Provisional application No. 62/343,220, filed on May 31, 2016.

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ...... G06F 3/044; G06F 3/0418; G06F 3/0412; G06F 3/0416
See application file for complete search history.

(56) References Cited

U.S. PATENT DOCUMENTS

2011/0007020 A1*   1/2011   Hong ................. G06F 3/0412
                                                              345/174
2015/0234497 A1*   8/2015   Hung ..................... H05K 1/11
                                                              345/174

* cited by examiner

*Primary Examiner* — Wing H Chow
(74) *Attorney, Agent, or Firm* — Muncy, Geissler, Olds & Lowe, P.C.

(57) ABSTRACT

A capacitive touch panel includes a substrate having a touch sensing layer on the surface thereof, and an electrode module mounted in the touch sensing layer and including first electrodes arranged in parallel in X-axis direction and second electrodes arranged in parallel in Y-axis direction. Each first electrode includes multiple first electrode elements and multiple first signal lines arranged in X-axis direction and respectively electrically connected between each two adjacent first electrode elements. Each second electrode includes multiple second electrode elements respectively disposed adjacent to and spaced from the first electrode elements of one respective first electrode and multiple second signal lines arranged in Y-axis direction and respectively electrically connected between each two adjacent second electrode elements. Thus, the electrode module accurately senses the touch signal of the touch sensing layer without distortion.

7 Claims, 4 Drawing Sheets

CAPACITIVE TOUCH PANEL

CROSS REFERENCE TO RELATED APPLICATIONS

This application claims priority of U.S. Provisional Application No. 62/343,220 filed on May 31, 2016 under 35 U.S.C. § 119(e), the entire contents of all of which are hereby incorporated by reference.

BACKGROUND OF THE INVENTION

1. Field of the Invention

The present invention relates to touch control technology and more particularly, to a capacitive touch panel, which comprises a substrate having a touch sensing layer on the surface thereof, and an electrode module mounted in the touch sensing layer and consisting of a plurality of first electrodes and a plurality of second electrodes that are arranged to exhibit a perpendicular relationship so that the second electrodes of the electrode module can accurately detect the touch position on the substrate, avoiding an excessively large backwash signal to cause distortion.

2. Description of the Related Art

With the development of the innovation of high technology electronic products, a variety of electronic products such as desk computers, notebook computers, mobile phones, auto teller machines, etc. have been created and widely used in our daily life. In the early days, most electronic products use a physical keyboard for the input of control instruction or signal to initiate system startup. However, some electronic products have a small size with minimized physical input keys. When clicking these minimized physical input keys, the user may inadvertently click a wrong key, leading to considerable trouble and inconvenience in input operation. In recent years, touch screen has been intensively used in smart electronic products such as smart phone, tablet computer, auto teller machine, commercial kiosk machine, etc. to substitute for physical keyboard for data input. A user can use a finger or stylus to touch a particular location within the display area of the touch screen, initiating an internal controller of the touch screen-based electronic product to run the related software. Commercial touch screens include two types, namely, the capacitive type and the resistive type. When a finger, stylus or any other conductive object touches or approaches the touch screen, the internal capacitive value of the touch screen is changed. This change in capacitive value is then detected by the internal controller for determination of the location of the touch on the touch screen and execution of the related action.

A conventional touch screen panel generally comprises a plurality of driving electrodes arranged in parallel in the transverse (X-axis) direction, and a plurality of sensing electrodes arranged in the longitudinal (Y-axis) direction perpendicular to the transversely arranged driving electrodes. The drive mode of a conventional touch screen panel is to scan the driving electrodes sequentially from top to bottom. When one driving electrode is activated, the other driving electrodes are grounded. Thus, when a user touches the touch screen with one finger, the driving electrode at the point the user's finger touched is activated, and the other driving electrodes are grounded for discharging backwash signal, avoiding sensing interference and enabling the touch screen to response to the touch point. However, when multiple fingers A of the user approach or touch one same sensing electrode B1 in the touch sensing layer B of the touch screen (see FIG. 4), a large backwash signal will be provided by the surrounding multiple driving electrodes B2, affecting the sensing of the sensing electrode B1. At this time, a sensing distortion can occur, resulting in a touch position determination error of the touch sensing layer B and causing the touch screen to respond with a wrong signal. Under this situation, the user will be unable to operate the touch screen accurately. Thus, in actual application, conventional touch screen panels are still not satisfactory in function.

Therefore, how to solve the erroneous sensing problem of conventional touch screen panels in a multi-touch operation is the studying direction of the manufacturers in the touch screen industry need to face.

SUMMARY OF THE INVENTION

The present invention has been accomplished under the circumstances in view. It is therefore the main object of the present invention to provide a capacitive touch panel consisting of a substrate and an electrode module, which enables the range of the touch area of the first electrode elements of the first electrodes of the electrode module to be maximized, so that the second electrodes of the electrode module can accurately detect the touch position on the substrate, avoiding an excessively large backwash signal to cause distortion.

To achieve this and other objects of the present invention, a capacitive touch panel comprises a substrate and an electrode module. The substrate comprises a touch sensing layer located on the surface thereof. The electrode module is mounted in the touch sensing layer, comprising a plurality of first electrodes arranged in parallel in X-axis direction, and a plurality of second electrodes arranged in parallel in Y-axis direction. Each first electrode comprises a plurality of first electrode elements, and a plurality of first signal lines arranged in X-axis direction and respectively electrically connected between each two adjacent first electrode elements. Each second electrode comprises a plurality of second electrode elements respectively disposed adjacent to and spaced from the first electrode elements of one respective first electrode, and a plurality of second signal lines arranged in Y-axis direction and respectively electrically connected between each two adjacent second electrode elements. Thus, the electrode module accurately senses the touch signal of the touch sensing layer, avoiding an excessively large backwash signal to cause distortion.

Further, the touch sensing layer of the substrate can be a single-layer indium tin oxide (SITO), or a double-layer indium tin oxide (DITO). In the case that the touch sensing layer of the substrate is a single-layer indium tin oxide (SITO), the first electrodes and the second electrodes are disposed in the same single layer in the single-layer indium tin oxide (SITO) of the touch sensing layer. In the case that the touch sensing layer of the substrate is a double-layer indium tin oxide (DITO), the first electrodes and the second electrodes are respectively disposed in the two layers of the double-layer indium tin oxide (DITO) of the touch sensing layer.

Preferably, the first electrode elements of the first electrodes are S-shaped; the second electrode elements of the second electrodes are contrary to the shape of the first electrode elements and exhibit an inverted S-shaped. Further, the first electrode elements and the second electrode elements each have two opposite sides selectively configured to exhibit a beveled straight shape, a zigzag shape, a wavy shape, or a trapezoidal shape. Further, the first electrode elements have respective opposite ends thereof aligned in the transverse (X-axis) direction and respectively connected to the first signal lines; the second electrode elements have respective opposite ends thereof aligned in the longitudinal (Y-axis) direction and respectively connected to the second signal lines. Further, the second signal lines extend in a perpendicular manner relative to the first signal lines.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
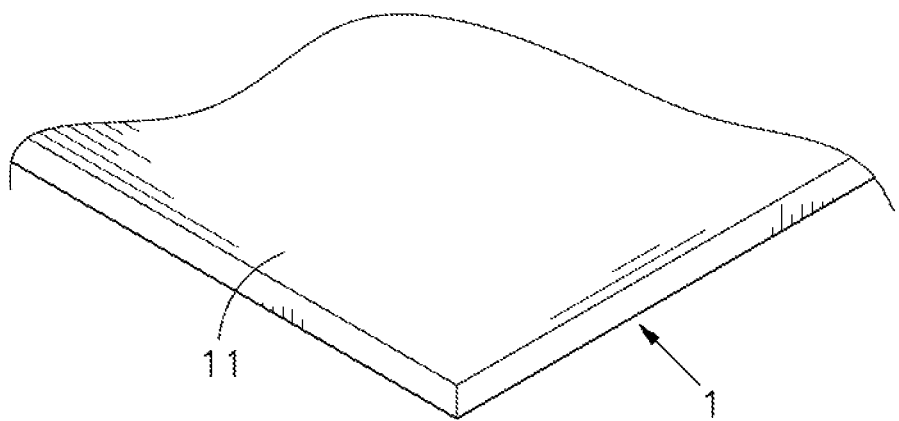
FIG. 1 is a schematic drawing of a part of a capacitive touch panel in accordance with the present invention.
Figure 2:
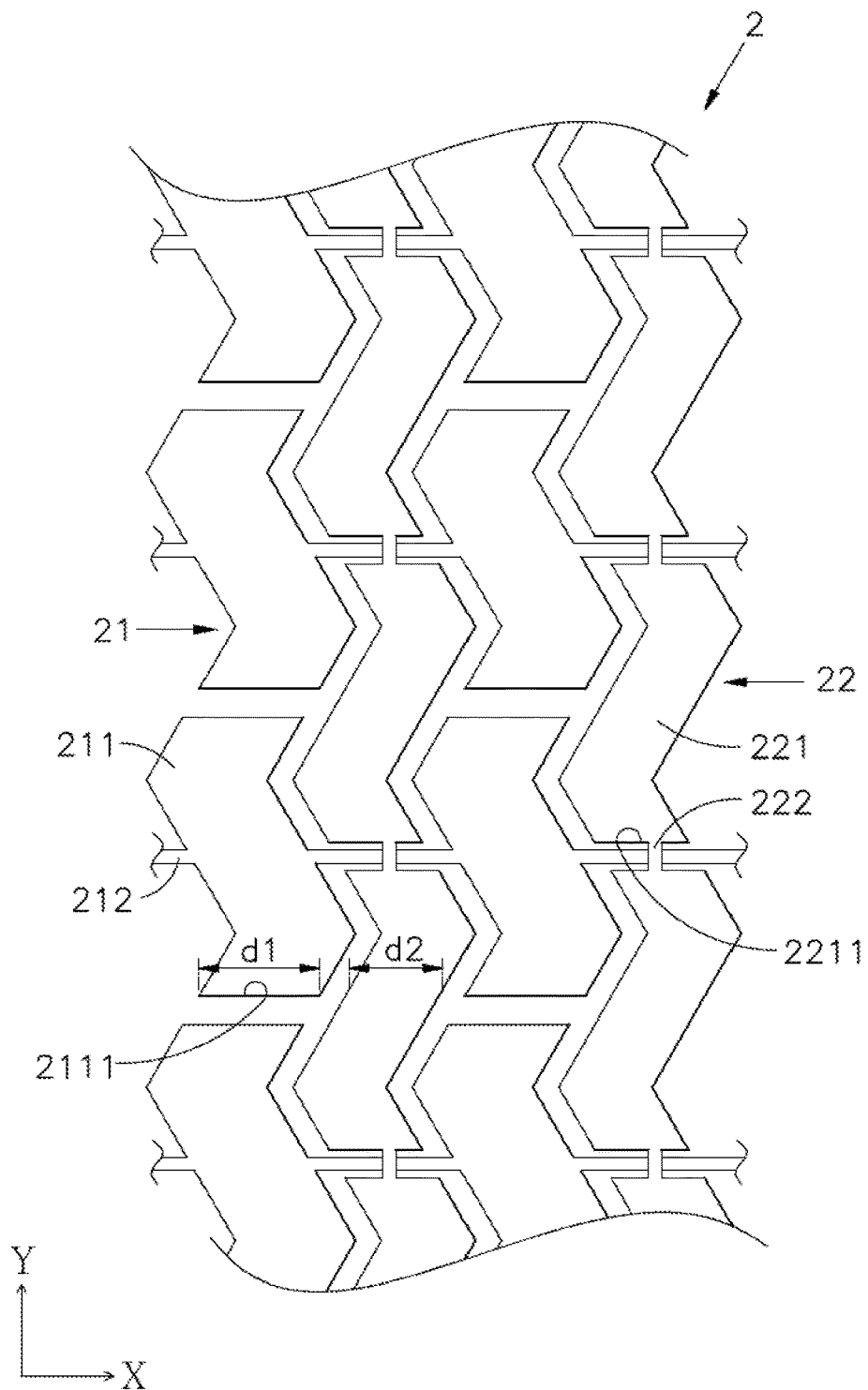
FIG. 2 is a plain view, illustrating the architecture of the electrode module of the capacitive touch panel in accordance with the present invention.
Figure 3:
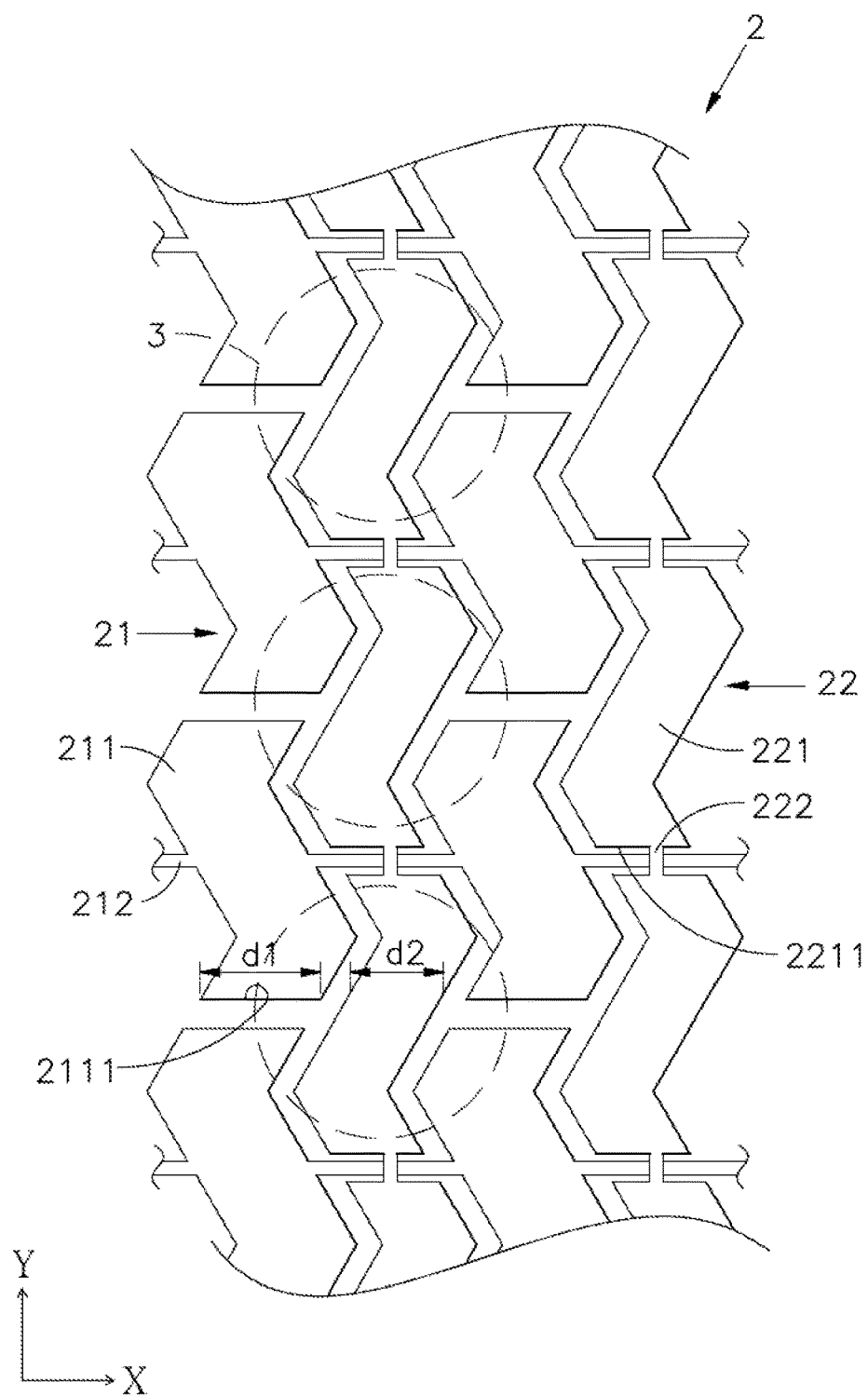
FIG. 3 is a plain view of the preferred embodiment of the electrode module of the capacitive touch panel in accordance with the present invention.
Figure 4:
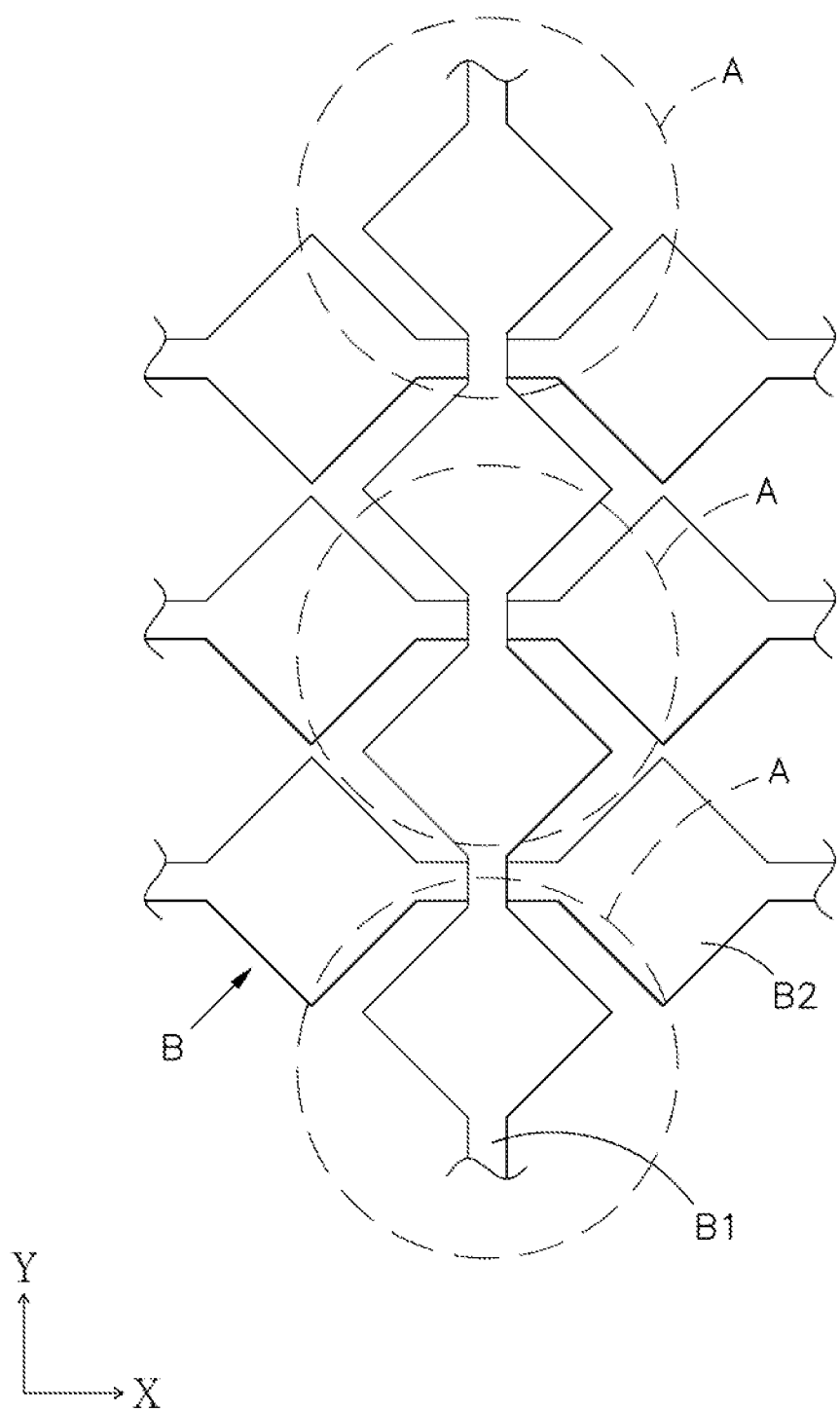
FIG. 4 is a plain view of a touch sensing layer of a touchscreen according to the prior art.

Referring to FIGS. 1-3, a capacitive touch panel in accordance with the present invention is shown. The capacitive touch panel comprises a substrate 1 and an electrode module 2.

The substrate 1 comprises a touch sensing layer 11 located on a surface thereof. The electrode module 2 is mounted in the touch sensing layer 11, comprising a plurality of first electrodes 21 arranged in parallel and extending in one same direction, and a plurality of second electrodes 22 arranged in parallel and extending in a perpendicular manner relative to the extending direction of the first electrodes 21. Each first electrode 21 comprises a plurality of first electrode elements 211, and a plurality of first signal lines 212 extended in the transverse (X-axis) direction and respectively connected between each two adjacent first electrode elements 211. Each second electrode 22 comprises a plurality of second electrode elements 221 respectively arranged adjacent to and kept apart from the first electrode elements 211, and a plurality of second signal lines 222 extended in the longitudinal (Y-axis) direction and respectively connected between each two adjacent second electrode elements 221. Thus, the second signal lines 222 exhibit a perpendicular relationship with the respective first signal lines 212.

The touch sensing layer 11 of the substrate 1 can be a single-layer indium tin oxide (SITO), a double-layer indium tin oxide (DITO), or other equivalent structure. In the case that the touch sensing layer 11 is a single-layer indium tin oxide (SITO), the first electrodes 21 and the second electrodes 22 are disposed in the same layer of the touch sensing layer 11; in the case that the touch sensing layer 11 is a double-layer indium tin oxide (DITO), the first electrodes 21 and the second electrodes 22 are respectively disposed in the two layers of the double-layer indium tin oxide of the touch sensing layer 11.

As stated above, the first electrodes 21 of the electrode module 2 are arranged in parallel and extended in the transverse (X-axis) direction; the second electrodes 22 are arranged in parallel and extended in the longitudinal (Y-axis) direction; the first electrode elements 211 of the first electrode 21 are respectively disposed adjacent to the respective second electrode elements 221 of the second electrode 22 in a parallel manner; the first signal lines 212 between each two adjacent first electrode elements 211 extend in a perpendicular manner relative to the second signal lines 222 between each two adjacent second electrode elements 222; the first electrode elements 211 of the first electrodes 21 are S-shaped; the second electrode elements 221 of the second electrodes 22 are contrary to the shape of the first electrode elements 211 (i.e., the second electrode elements 221 exhibit an inverted S-shaped); further, the first electrode elements 211 and the second electrode elements 221 each have two opposite sides in a beveled straight shape, zigzag shape, wavy shape, trapezoidal shape, or any other regular or irregular shape.

Further, each first electrode element 211 of each first electrode 21 has two opposite straight first end edges 2111 that extend in the transverse (X-axis) direction; each second electrode element 221 of each second electrode 22 has two opposite straight second end edges 2211 that extend in the transverse (X-axis) direction; the width (d1) of the two opposite straight first end edges 2111 of each first electrode element 211 of each first electrode 21 is larger than or equal to the width (d2) of the two opposite straight second end edges 2211 of each second electrode element 221 of each second electrode 22, i.e., first end edge 2111 [d1]≥second end edge 2211 [d2]; the width (d1) of the two opposite straight first end edges 2111 of each first electrode element 211 of each first electrode 21 and the width (d2) of the two opposite straight second end edges 2211 of each second electrode element 221 of each second electrode 22 have a respective predetermined value (e.g., 1 mm, 2 mm, 3 mm, or other set size value) that be adjusted according to the length and width of the substrate 1.

In actual application, the first electrode elements 211 of the first electrodes 21 of the electrode module 2 in the touch sensing layer 11 of the substrate 1 are configured for the function of driving; when one first electrode element 211 is being touched, the other first electrode elements 211 are grounded. The second electrode elements 221 of the second electrodes 22 are configured for the function of sensing; the second electrode elements 221 scan sequentially from the top to the bottom to drive the first electrode elements 211. When the user touches the surface of the touch sensing layer 11 of the substrate 1 with one finger 3, the second electrode element 221 in the touch position drives one respective first electrode element 211 to transmit a signal to the control unit (not shown) of the touch sensing layer 11 so as to provide an action or function corresponding to the touched point, and such a touch is displayed on the screen of the substrate 1, and at this time, the other first electrode elements 211 are grounded, and thus, the second electrode 22 in the touch position can sense the position signal of the touch position. Further, the second electrode elements 221 extend in the longitudinal (Y-axis) direction in an S-shaped manner. Further, the two opposite straight second end edges 2211 of each second electrode element 221 of each second electrode 22 have the same width (d2). When the user touches the surface of the touch sensing layer 11 of the substrate 1 with multiple fingers 3 and the touching position is in the second electrodes arranged in parallel in Y-axis direction, the range of the touch area of the first electrode elements 211 can be maximized. The backwash signal detected by the respective second electrode elements 221 can be discharged through the respective first electrode elements 211, avoiding sensing signal distortion, enabling the second electrodes 22 to detect the accurate touch position of the fingers 3 on the substrate 1, and preventing the touch sensing layer 11 from transmitting an unrelated or erroneous corresponding action or function to the touch screen of the substrate 1.

As described above, the touch sensing layer 11 of the substrate 1 of the capacitive touch panel can be a single layer design, or a double-layer design; the first electrodes 21 and second electrodes 22 of the electrode module 2 are mounted in the touch sensing layer 11; the first electrode elements 211 of the first electrodes 21 are electrically connected by the respective first signal lines 212 that extend in the same direction [transverse (X-axis) direction]; the second electrode elements 221 of the second electrodes 22 are electrically connected by the respective second signal lines 222 that extend in one same direction [longitudinal (Y-axis) direction]; the first electrodes 21 extend in a perpendicular manner relative to the second electrodes 22; the first electrode elements 211 and the second electrode elements 221 are respectively disposed in an S-shaped staggered arrangement so that the range of the touch area of the first electrode elements 211 can be maximized, avoiding an excessively large backwash signal to cause distortion and enabling the second electrodes 22 to accurately detect the touch position of the finger 3 on the substrate 1. Thus, the touch sensing layer 11 can accurately provide an action or function corresponding to the touched point.

In conclusion, the invention provides a capacitive touch panel, which comprises a substrate having a touch sensing layer of single layer or double layer design located on the surface thereof, and an electrode module mounted in the touch sensing layer. The electrode module comprises a plurality of first electrodes each comprising a plurality of first electrode elements that extend in the transverse (X-axis) direction, and a plurality of second electrodes each comprising a plurality of second electrode elements that extend in the longitudinal (Y-axis) direction. The first electrode elements have the same first width (d1). The second electrode elements have the same second width (d2). Thus, the range of the touch area of the first electrode elements can be maximized. When one first electrode element is touched by the user, the other first electrode elements are grounded, avoiding an excessively large backwash signal to cause distortion and enabling the second electrodes to accurately detect the touch position on the substrate.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A capacitive touch panel, comprising: a substrate comprising a touch sensing layer located on a surface thereof; and an electrode module mounted in said touch sensing layer of said substrate, said electrode module comprising a plurality of first electrodes extending in a first direction and arranged in parallel and a plurality of second electrodes extending in a second direction perpendicular to said first direction and arranged in parallel, each said first electrode comprising a plurality of first electrode elements and a plurality of first signal lines extending in one same direction and respectively electrically connected between each two adjacent said first electrode elements, said first electrode elements of said plurality of first electrodes are S-shaped, each said second electrode comprising a plurality of second electrode elements, said second electrode elements of said second electrodes are contrary to the shape of said first electrode elements and exhibit an inverted S-shape and a plurality of second signal lines respectively electrically connected between each two adjacent said second electrode elements and extending in a perpendicular manner relative to the extending direction of said first signal lines; said second electrode elements respectively disposed adjacent to and spaced from the said first electrode elements of one respective said first electrode; wherein the S-shape is a twisted concave octagon with four pairs of parallel edges.

2. The capacitive touch panel as claimed in claim 1, wherein said touch sensing layer of said substrate is selectively a single-layer indium tin oxide (SITO) in which said first electrodes and said second electrodes are disposed in the same single layer in the single-layer indium tin oxide (SITO) of said touch sensing layer, or a double-layer indium tin oxide (DITO) in which said first electrodes and said second electrodes are respectively disposed in the two layers of the double-layer indium tin oxide (DITO) of said touch sensing layer.

3. The capacitive touch panel as claimed in claim 1, wherein said first electrodes of said electrode module extend in a transverse (X-axis) direction and arranged in parallel; said second electrodes of said electrode module extend in a longitudinal (Y-axis) direction perpendicular to said transverse (X-axis) direction and arranged in parallel; said first signal lines of said first electrodes exhibit a perpendicular relationship with said second signal lines of said second electrodes.

4. The capacitive touch panel as claimed in claim 1, wherein said first electrode elements and said second electrode elements each have two opposite sides selectively configured to exhibit a beveled straight shape, a zigzag shape, a wavy shape, or a trapezoidal shape.

5. The capacitive touch panel as claimed in claim 1, wherein said first electrode elements have respective opposite ends thereof aligned in the said transverse (X-axis) direction and respectively connected to said first signal lines; said second electrode elements have respective opposite ends thereof aligned in the said longitudinal (Y-axis) direction and respectively connected to said second signal lines; said second signal lines extend in a perpendicular manner relative to said first signal lines.

6. The capacitive touch panel as claimed in claim 1, wherein said first electrode elements and said second electrode elements each have two straight opposite end edges, the width (d1) of the straight end edges of said first electrode elements being larger than or equal to the width (d2) of the straight end edges of second electrode elements.

7. The capacitive touch panel as claimed in claim 1, wherein said first electrodes are driving electrodes so configured that when one first electrode element of one said first electrode is being activated, the other said first electrode elements of the respective said first electrode are grounded; said second electrodes are sensing electrodes.

* * * * *